US011265864B2

(12) United States Patent
Zhou et al.

(10) Patent No.: US 11,265,864 B2
(45) Date of Patent: Mar. 1, 2022

(54) SINGLE DOWNLINK CONTROL INFORMATION FOR JOINT DOWNLINK AND UPLINK ALLOCATION

(71) Applicant: QUALCOMM Incorporated, San Diego, CA (US)

(72) Inventors: Yan Zhou, San Diego, CA (US); Tao Luo, San Diego, CA (US); Hamed Pezeshki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 116 days.

(21) Appl. No.: 16/820,250

(22) Filed: Mar. 16, 2020

(65) Prior Publication Data

US 2020/0305133 A1    Sep. 24, 2020

Related U.S. Application Data

(60) Provisional application No. 62/822,550, filed on Mar. 22, 2019.

(51) Int. Cl.
*H04W 72/04*    (2009.01)
*H04W 76/27*    (2018.01)

(52) U.S. Cl.
CPC ......... *H04W 72/042* (2013.01); *H04W 76/27* (2018.02)

(58) Field of Classification Search
CPC ............................ H04W 72/042; H04W 76/27
See application file for complete search history.

(56) References Cited

U.S. PATENT DOCUMENTS

| 2013/0163534 A1* | 6/2013 | Anderson | H04L 1/0026 370/329 |
|---|---|---|---|
| 2014/0105158 A1 | 4/2014 | Kim et al. | |
| 2014/0169312 A1* | 6/2014 | Wang | H04W 48/12 370/329 |
| 2016/0037492 A1* | 2/2016 | Xu | H04L 5/14 370/280 |
| 2016/0192331 A1* | 6/2016 | Liang | H04W 24/10 370/329 |

(Continued)

OTHER PUBLICATIONS

NEC, DCI monitoring configuration for mini-slot, 3GPP TSG RAN WG1 Meeting #88, R1-1701980, Athens, Greece Feb. 13-17, 2017, pp. 1-2 (Year: 2017).*

(Continued)

*Primary Examiner* — Farid Seyedvosoghi
(74) *Attorney, Agent, or Firm* — Harrity & Harrity, LLP

(57) ABSTRACT

Various aspects of the present disclosure generally relate to wireless communication. In some aspects, a user equipment (UE) may receive a single downlink control information (DCI). The user equipment may identify, based at least in part on the single DCI, a set of downlink resources allocated to the UE for a downlink communication and a set of uplink resources allocated to the UE for an uplink communication. In some aspects, a base station may allocate a set of downlink resources to a UE for a downlink communication and a set of uplink resources to the UE for an uplink communication. The base station may transmit a single DCI including information associated with identifying the set of downlink resources and the set of uplink resources. Numerous other aspects are provided.

30 Claims, 10 Drawing Sheets

(56) References Cited

U.S. PATENT DOCUMENTS

2017/0207843 A1* 7/2017 Jung .................... H04B 7/0695
2017/0325257 A1* 11/2017 Liu ....................... H04L 5/0053

OTHER PUBLICATIONS

International Search Report and Written Opinion—PCT/US2020/023127—ISA/EPO—dated Jun. 17, 2020.
NEC: "DCI Monitoring Configuration for Mini-Slot", 3GPP Draft, 3GPP TSG RAN WG1 Meeting #88, R1-1701980, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 13, 2017-Feb. 17, 2017, Feb. 12, 2017 (Feb. 12, 2017), XP051209142, 2 pages, Retrieved from the Internet: URL: http://www.3gpp.org/ftp/Meetings_3GPP_SYNC/RAN1/Docs/. [retrieved on Feb. 12, 2017] p. 2; figure 1.
International Search Report and Written Opinion—PCT/US2020/023127—ISA/EPO—dated Jul. 26, 2021.

* cited by examiner

SINGLE DOWNLINK CONTROL INFORMATION FOR JOINT DOWNLINK AND UPLINK ALLOCATION

CROSS-REFERENCE TO RELATED APPLICATION

This patent application claims priority to U.S. Provisional Patent Application No. 62/822,550, filed on Mar. 22, 2019, entitled "SINGLE DOWNLINK CONTROL INFORMATION FOR JOINT DOWNLINK AND UPLINK ALLOCATION," and assigned to the assignee hereof. The disclosure of the prior application is considered part of and is incorporated by reference in this patent application.

FIELD OF THE DISCLOSURE

Aspects of the present disclosure generally relate to wireless communication, and more particularly to techniques and apparatuses for single downlink control information (DCI) for joint downlink and uplink allocation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a single downlink control information (DCI); and identifying, based at least in part on the single DCI, a set of downlink resources allocated to the UE for a downlink communication and a set of uplink resources allocated to the UE for an uplink communication.

In some aspects, a UE for wireless communication may include memory and one or more processors operatively coupled to the memory. The memory and the one or more processors may be configured to receive a single DCI; and identify, based at least in part on the single DCI, a set of downlink resources allocated to the UE for a downlink communication and a set of uplink resources allocated to the UE for an uplink communication.

In some aspects, a non-transitory computer-readable medium may store one or more instructions for wireless communication. The one or more instructions, when executed by one or more processors of a UE, may cause the one or more processors to receive a single DCI; and identify, based at least in part on the single DCI, a set of downlink resources allocated to the UE for a downlink communication and a set of uplink resources allocated to the UE for an uplink communication.

In some aspects, an apparatus for wireless communication may include means for receiving a single DCI; and means for identifying, based at least in part on the single DCI, a set of downlink resources allocated to the apparatus for a downlink communication and a set of uplink resources allocated to the apparatus for an uplink communication.

In some aspects, a method of wireless communication, performed by a base station, may include allocating a set of downlink resources to a UE for a downlink communication and a set of uplink resources to the UE for an uplink communication; and transmitting a single DCI including information associated with identifying the set of downlink resources and the set of uplink resources.

In some aspects, a base station for wireless communication may include memory and one or more processors operatively coupled to the memory. The memory and the one or more processors may be configured to allocate a set of downlink resources to a UE for a downlink communication and a set of uplink resources to the UE for an uplink communication; and transmit a single DCI including information associated with identifying the set of downlink resources and the set of uplink resources.

In some aspects, a non-transitory computer-readable medium may store one or more instructions for wireless communication. The one or more instructions, when executed by one or more processors of a base station, may cause the one or more processors to allocate a set of downlink resources to a UE for a downlink communication and a set of uplink resources to the UE for an uplink communication; and transmit a single DCI including information associated with identifying the set of downlink resources and the set of uplink resources.

In some aspects, an apparatus for wireless communication may include means for allocating a set of downlink resources to a UE for a downlink communication and a set of uplink resources to the UE for an uplink communication; and means for transmitting a single DCI including information for identifying the set of downlink resources and the set of uplink resources.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
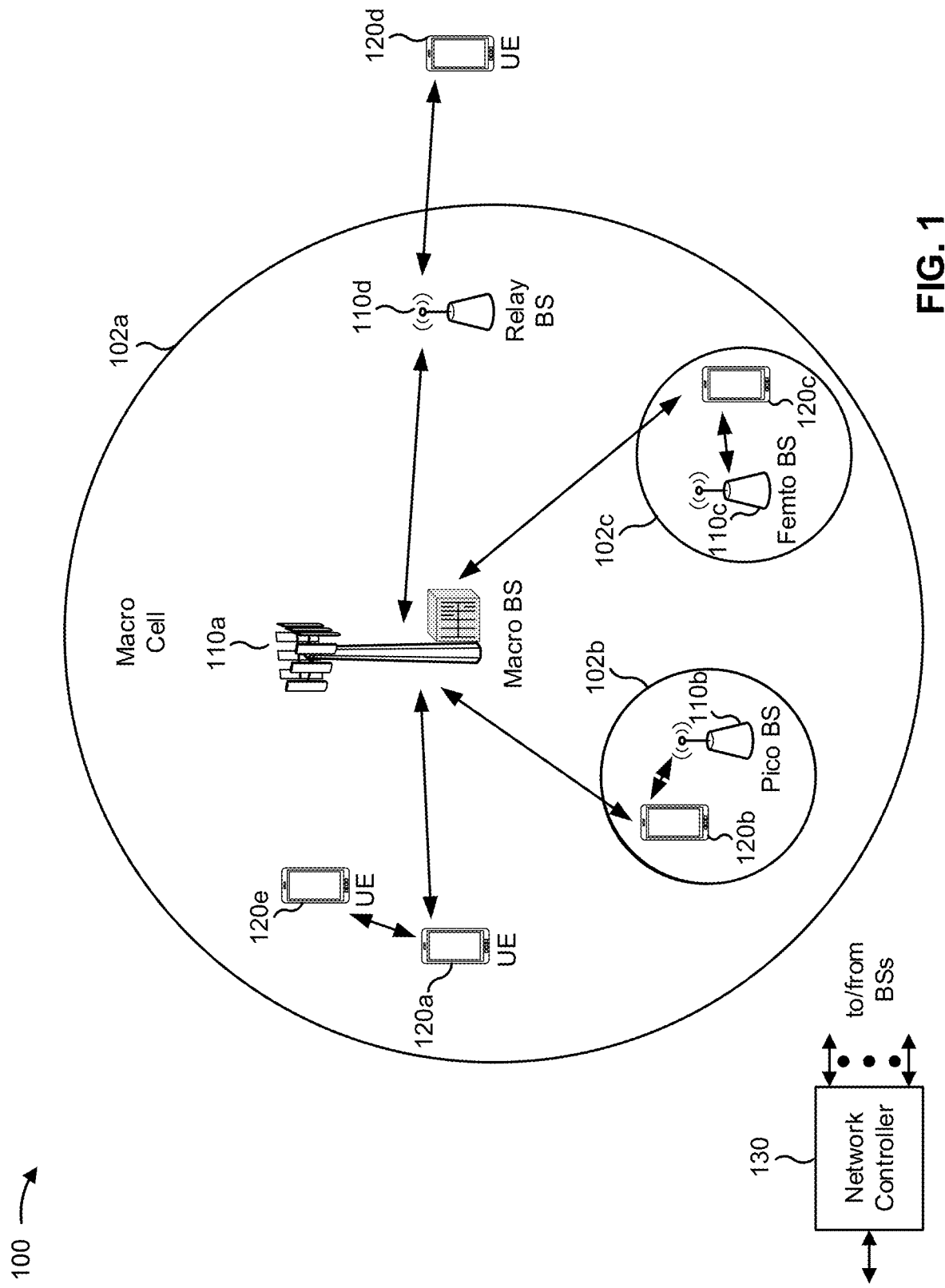
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
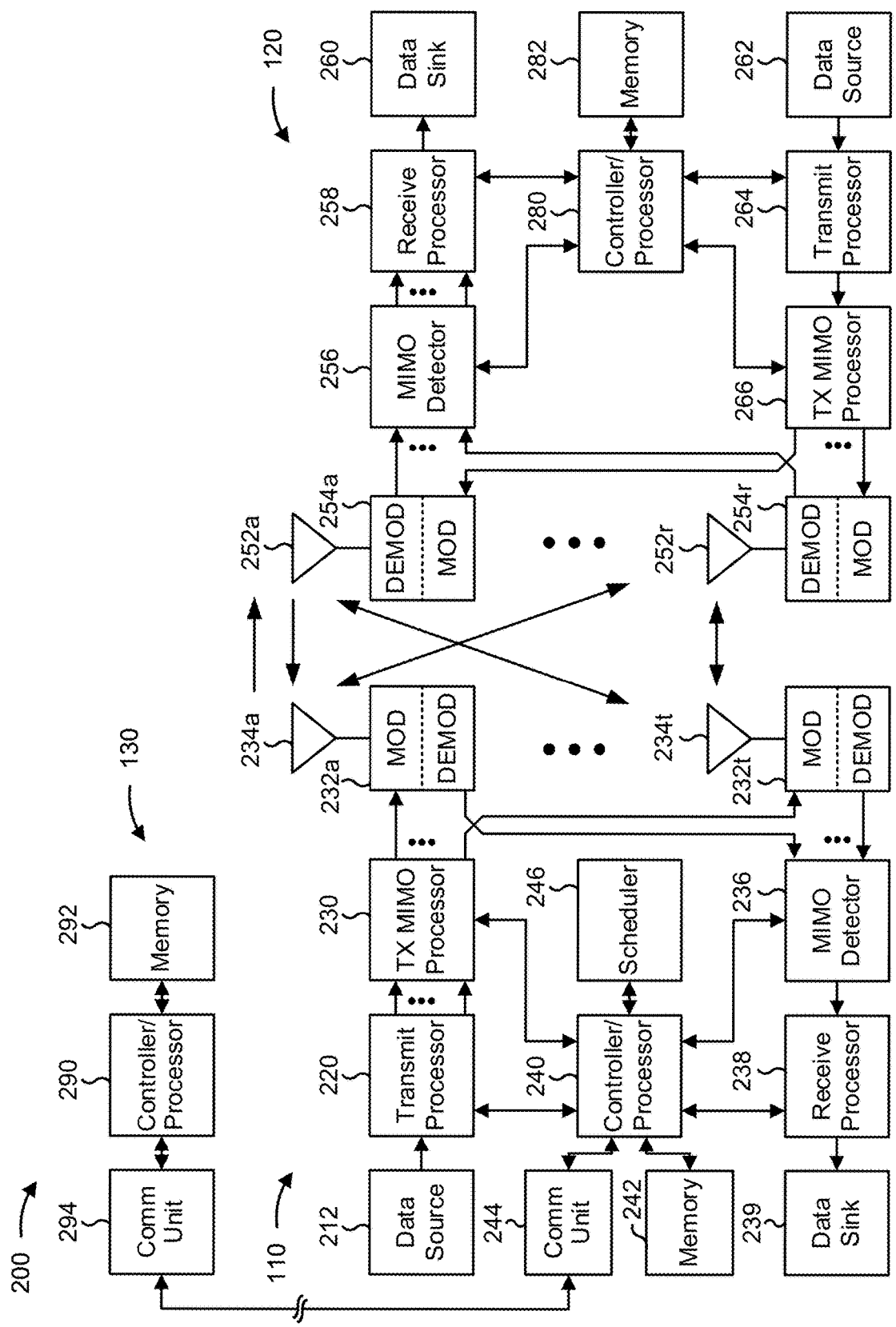
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with single DCI for joint downlink and uplink allocation, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving a single DCI; means for identifying, based at least in part on the single DCI, a set of downlink resources allocated to the UE for a downlink communication and a set of uplink resources allocated to the UE for an uplink communication; and/or the like. In some aspects, such means may include one or more components of UE 120 described in connection with FIG. 2.

In some aspects, base station 110 may include means for allocating a set of downlink resources to a UE (e.g., UE 120) for a downlink communication and a set of uplink resources to the UE for an uplink communication; means for transmitting a single DCI including information associated with identifying the set of downlink resources and the set of uplink resources; and/or the like. In some aspects, such means may include one or more components of base station 110 described in connection with FIG. 2.

As indicated above, FIG. 2 is provided as an example. Other examples may differ from what is described with regard to FIG. 2.

Figure 3:
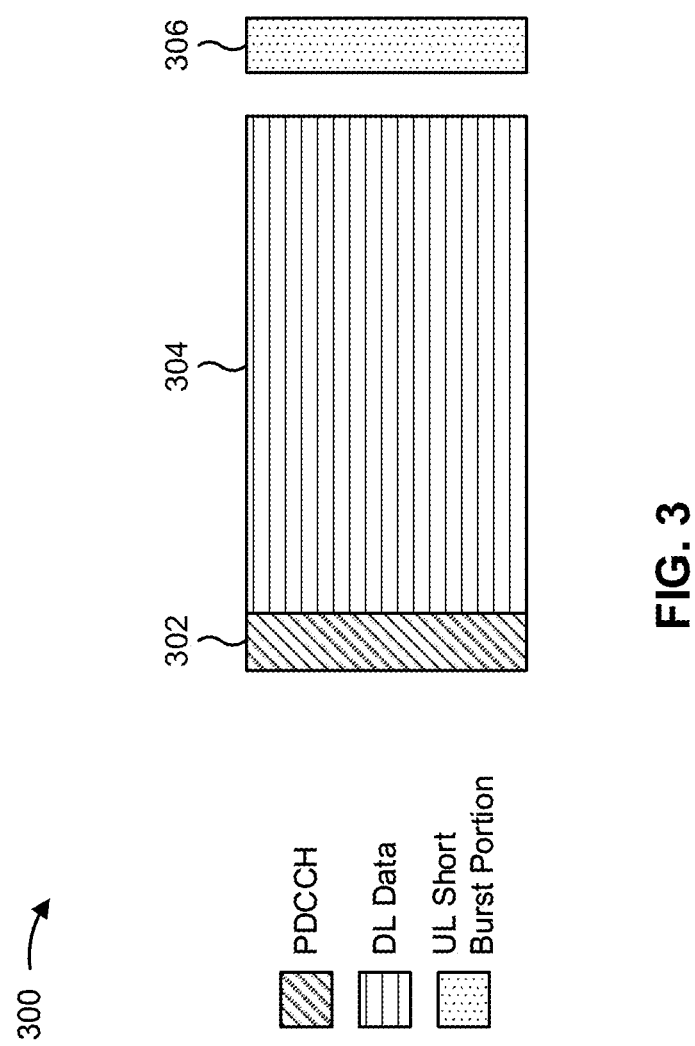
FIG. 3 is a diagram illustrating an example of a downlink (DL)-centric slot, in accordance with various aspects of the present disclosure.

FIG. 3 is a diagram 300 showing an example of a DL-centric slot or wireless communication structure. The DL-centric slot may include a control portion 302. The control portion 302 may exist in the initial or beginning portion of the DL-centric slot. The control portion 302 may include various scheduling information and/or control information corresponding to various portions of the DL-centric slot. In some configurations, the control portion 302 may be a physical DL control channel (PDCCH), as indicated in FIG. 3. In some aspects, the control portion 302 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, and/or the like), and/or the like.

The DL-centric slot may also include a DL data portion 304. The DL data portion 304 may sometimes be referred to as the payload of the DL-centric slot. The DL data portion 304 may include the communication resources utilized to communicate DL data from the scheduling entity (e.g., UE or BS) to the subordinate entity (e.g., UE). In some configurations, the DL data portion 304 may be a physical DL shared channel (PDSCH).

The DL-centric slot may also include an UL short burst portion 306. The UL short burst portion 306 may sometimes be referred to as an UL burst, an UL burst portion, a common UL burst, a short burst, an UL short burst, a common UL short burst, a common UL short burst portion, and/or various other suitable terms. In some aspects, the UL short burst portion 306 may include one or more reference signals. Additionally, or alternatively, the UL short burst portion 306 may include feedback information corresponding to various other portions of the DL-centric slot. For example, the UL short burst portion 306 may include feedback information corresponding to the control portion 302 and/or the DL data portion 304. Non-limiting examples of information that may be included in the UL short burst portion 306 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 306 may include additional or alternative information, such as information pertaining to random access channel (RACH) procedures, scheduling requests, and various other suitable types of information.

As illustrated in FIG. 3, the end of the DL data portion 304 may be separated in time from the beginning of the UL short burst portion 306. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is one example of a DL-centric wireless communication structure, and alternative structures having similar features may exist without necessarily deviating from the aspects described herein.

As indicated above, FIG. 3 is provided as an example. Other examples may differ from what is described with regard to FIG. 3.

Figure 4:
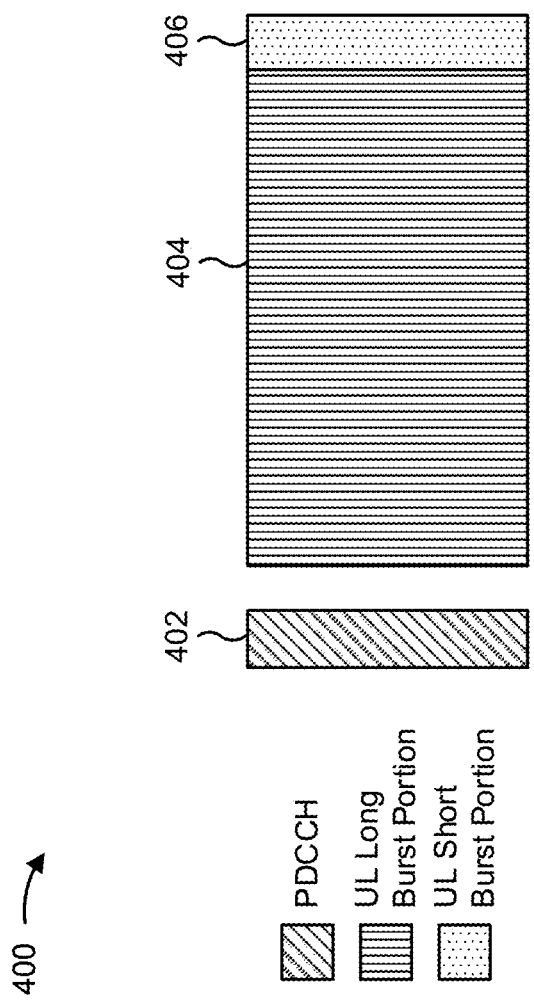
FIG. 4 is a diagram illustrating an example of an uplink (UL)-centric slot, in accordance with various aspects of the present disclosure.

FIG. 4 is a diagram 400 showing an example of an UL-centric slot or wireless communication structure. The UL-centric slot may include a control portion 402. The control portion 402 may exist in the initial or beginning portion of the UL-centric slot. The control portion 402 in FIG. 4 may be similar to the control portion 302 described above with reference to FIG. 3. The UL-centric slot may also include an UL long burst portion 404. The UL long burst portion 404 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 402 may be a physical DL control channel (PDCCH).

As illustrated in FIG. 4, the end of the control portion 402 may be separated in time from the beginning of the UL long burst portion 404. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an UL short burst portion 406. The UL short burst portion 406 in FIG. 4 may be similar to the UL short burst portion 306 described above with reference to FIG. 3, and may include any of the information described above in connection with FIG. 3. The foregoing is one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some aspects, the sidelink signals may be communicated using a licensed spectrum (unlike wireless local area networks, which typically use an unlicensed spectrum).

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIG. 4 is provided as an example. Other examples may differ from what is described with regard to FIG. 4.

In a wireless network, downlink communications and uplink communications associated with a given UE are typically scheduled in different DCIs. For example, a downlink communication (e.g., a PDSCH communication) is scheduled using a first DCI (e.g., in a first PDCCH communication using, for example, using DCI format 1_0 or 1_1), while an uplink communication (e.g., a PUSCH communication) is scheduled using a second DCI (e.g., in a second PDCCH communication using, for example, DCI format 0_0 or 0_1). In this example, the first DCI includes information associated with identifying a set of downlink resources allocated to the UE for the downlink communication, and the second DCI includes information associated with identifying a set of uplink resources allocated to the UE for the uplink communication. Thus, two DCIs are typically needed when a given UE is to both receive a downlink communication and to transmit an uplink communication.

However, the need to communicate multiple DCIs to the same UE increases overhead on the network, for example, due to the need for additional packets to be transmitted to and received by the UE. Further, latency between receipt of a downlink communication and transmission of an uplink communication may be increased due to processing gaps between downlink packets and uplink packets.

Some aspects described herein provide techniques and apparatuses for single DCI for joint downlink and uplink allocation. In some aspects, a UE may receive a single DCI (e.g., a single DCI transmitted by a base station), and may identify, based at least in part on the single DCI, a set of downlink resources allocated to the UE for a downlink communication and a set of uplink resources allocated to the UE for an uplink communication. In some aspects, the use of the single DCI reduces network overhead (e.g., by requiring comparatively fewer packets to be transmitted over the network), and also reduces latency between receipt of a downlink communication and transmission of an uplink communication (e.g., by reducing processing gaps between downlink packets and uplink packets).

FIGS. 5A-5D are diagrams associated with an example 500 of single DCI for joint downlink and uplink allocation, in accordance with various aspects of the present disclosure.

Figure 5A:
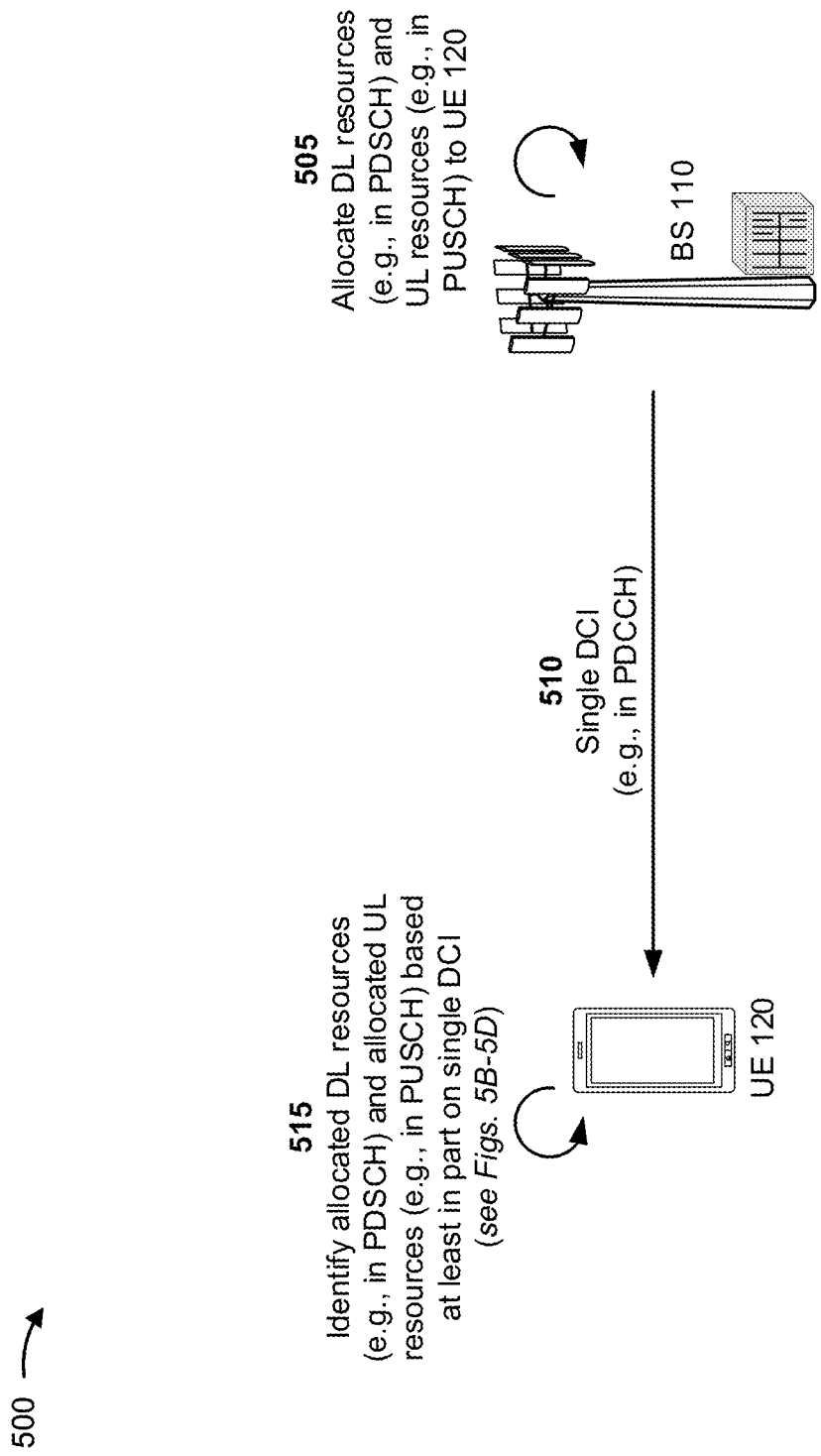
FIGS. 5A-5D are diagrams associated with an example of single DCI for joint downlink and uplink allocation, in accordance with various aspects of the present disclosure.

As shown in FIG. 5A, and by reference number 505, base station 110 may allocate a set of downlink resources (e.g., a set of PDSCH resources) to UE 120 for a downlink communication (e.g., a PDSCH communication). As further shown by reference number 505, the base station 110 may also allocate a set of uplink resources (e.g., a set of PUSCH resources) to UE 120 for an uplink communication (e.g., a PUSCH communication). In some aspects, base station 110 may allocate the set of downlink resources and/or the set of uplink resources based at least in part on determining that UE 120 is to both receive the downlink communication and transmit the uplink communication. In some aspects, base station 110 may allocate the set of downlink resources and/or the set of uplink resources in a manner known in the art.

As further shown in FIG. 5A, and by reference number 510, base station 110 may transmit a single DCI including information associated with identifying the set of downlink resources and the set of uplink resources. Various aspects regarding the single DCI are provided below.

As further shown in FIG. 5A, and by reference number 515, UE 120 may receive the single DCI, and may identify, based at least in part on the single DCI, the set of downlink resources allocated to the UE for the downlink communication and the set of uplink resources allocated to the UE for the uplink communication.

In some aspects, the single DCI may include information that identifies both the set of downlink resources and information that identifies the set of uplink resources.

For example, in some aspects, base station 110 may include, in the single DCI, resource allocation information. Here, the resource allocation information may include the information that (explicitly) identifies the set of downlink resources and the information that (explicitly) identifies the set of uplink resources. In such a case, the single DCI may use a previously unused DCI format, such as DCI format 2_4, and can include a set of cyclic redundancy check (CRC) bits that are scrambled by a new or existing radio network temporary identifier (RNTI). Here, UE 120 may receive and decode the single DCI in order to determine the information that identifies the set of downlink resources and the information that identifies the set of uplink resources.

As another example, in some aspects, base station 110 may include an indicator in the single DCI, and UE 120 may determine the information that identifies the set of downlink resources and/or the information that identifies the set of uplink resources based at least in part on the indicator. Here, the indicator may (implicitly) identify the set of downlink resources and/or the set of uplink resources. In such a case, the single DCI may use a previously used DCI format, such as DCI format 1_1, and a reserved bit or field entry in the previously used DCI format may carry the indicator. Here, UE 120 may receive and decode the single DCI in order to determine the indicator, and may identify the set of downlink resources and/or the set of uplink resources based at least in part on the indicator. For example, UE 120 may be configured with different items of allocation information, each of which corresponds to a particular set of downlink resources and/or a particular set of uplink resources. In this example, each item of allocation information is associated with a respective indicator. Here, upon receiving a single DCI including an indicator, UE 120 may identify the set of downlink resources and/or the set of uplink resources based at least in part on the association between the indicator and the allocation information. As a particular example, different reserved entries in an antenna port field of DCI format 1_1 can be used to signal different allocations of uplink resources (e.g., the details of which can be preconfigured via radio resource control (RRC) messaging).

In some aspects, the indicator may be a reserved bit included in the single DCI and/or may be a field entry included in the single DCI. In some aspects, the allocation information may be configured (e.g., preconfigured) on the UE via an RRC message and/or via a medium access control (MAC) control element.

Figure 5B:
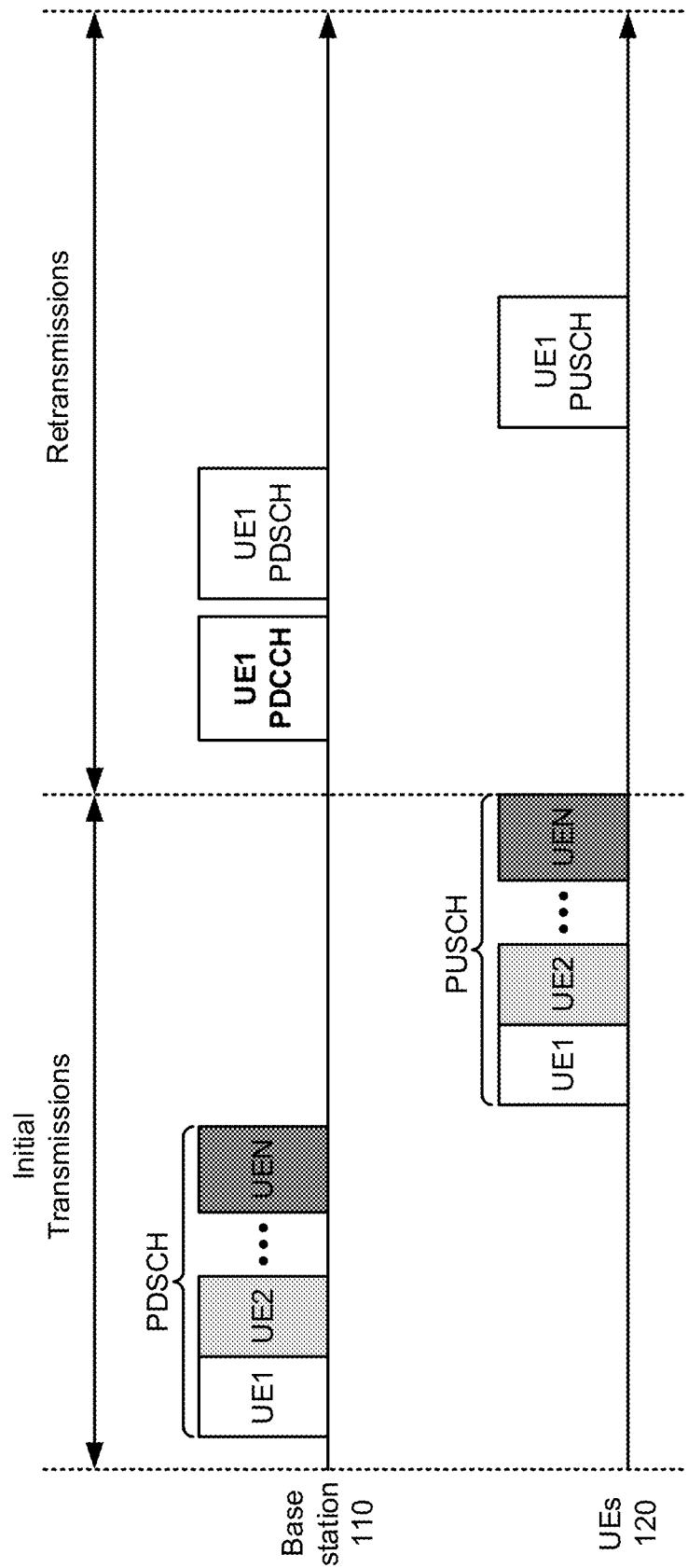

FIG. 5B is a diagram illustrating an example in which the single DCI includes information that identifies both the set of downlink resources and information that identifies the set of uplink resources. In FIG. 5B, UE1 is configured to receive an initial downlink communication (e.g., a PDSCH communication) and transmit an initial uplink communication (e.g., a PUSCH communication) based at least in part on, for example, semi-persistent scheduling information configured on UE1 (e.g., such that DCI is not needed for scheduling the initial downlink communication or the initial uplink communication). However, as indicated by FIG. 5B, UE1 may not successfully receive the initial downlink communication and may not successfully transmit the initial uplink communication (e.g., due to path loss to base station 110). Thus, as shown in FIG. 5B, retransmissions are needed. However, these retransmissions need to be scheduled. In the example shown in FIG. 5B, UE1 receives, from base station 110, a single DCI (e.g., in a PDCCH communication) that identifies both the set of downlink resources and information that identifies the set of uplink resources. Thus, as shown in FIG. 5B, UE 120 may receive the retransmission of the downlink communication (e.g., in the set of downlink resources allocated to the UE) and retransmit the uplink communication (e.g., in the set of uplink resources allocated to UE 120) based at least in part on the single DCI.

In some aspects, the single DCI may be a primary DCI that includes information associated with a secondary DCI, where the secondary DCI includes information associated with identifying at least one of the set of downlink resources or the set of uplink resources (e.g., information associated with identifying the set of downlink resources only, information associated with identifying the set of uplink resources only, or information associated with identifying both the set of downlink resources and the set of uplink resources). Here, base station 110 may transmit the secondary DCI, and UE 120 may, based at least in part on the primary DCI, receive the secondary DCI.

In some aspects, the primary DCI may include information associated with identifying one set of resources (i.e., either the set of downlink resources or the set of uplink resources). In such a case, the secondary DCI may include information associated with identifying the other set of resources (i.e., the set of resource not identified by the primary DCI). Alternatively, in some aspects, the primary DCI may not include information associated with identifying either the set of downlink resources or the set of uplink resources (e.g., when both the set of downlink resources and the set of uplink resources are to be identified based at least in part on information included in the secondary DCI).

In some aspects, the primary DCI may include information associated with the secondary DCI. For example, the primary DCI may include information indicating an existence of the secondary DCI and/or information indicating a format of the secondary DCI (e.g., such that UE 120 can determine that a secondary DCI is to be received and/or identify a format of the secondary DCI). As another example, the primary DCI may include resource allocation information that identifies a set of resources associated with the secondary DCI (e.g., information that identifies a set of resources in which UE 120 can expect to receive the secondary DCI).

As another example, the primary DCI may include an indicator associated with the secondary DCI, and UE 120 may determine the information associated with the secondary DCI based at least in part on the indicator. Here, the indicator may (implicitly) identify a set of resources of the secondary DCI. In such a case, the primary DCI may use a previously used DCI format, and a reserved bit or field entry in the previously used DCI format may carry the indicator associated with the secondary DCI. Here, UE 120 may receive and decode the primary DCI in order to determine the indicator, and may identify the set of resources of the secondary DCI based at least in part on the indicator. For example, UE 120 may be configured with different items of allocation information, each of which corresponds to a particular set of resources. In this example, each item of allocation information is associated with a respective indicator. Here, upon receiving a primary DCI including an indicator, UE 120 may identify the set of resources of the secondary DCI based at least in part on the association between the indicator and the allocation information.

In some aspects, the secondary DCI may include information that identifies at least one of the set of downlink resources or information that identifies the set of uplink resources. For example, in some aspects, base station 110 may include, in the secondary DCI, resource allocation information. Here, the resource allocation information may include the information that (explicitly) identifies the set of downlink resources and/or the information that (explicitly) identifies the set of uplink resources. In this example, UE 120 may receive and decode the secondary DCI in order to determine the information that identifies the set of downlink resources and/or the information that identifies the set of uplink resources.

As another example, in some aspects, base station 110 may include an indicator in the secondary DCI, and UE 120 may determine the information that identifies the set of downlink resources and/or the information that identifies the set of uplink resources based at least in part on the indicator. Here, the indicator may (implicitly) identify the set of downlink resources and/or the set of uplink resources. In this example, after receiving the primary DCI and determining the information associated with the secondary DCI, UE 120 may receive and decode the secondary DCI in order to determine the indicator, and may identify the set of downlink resources and/or the set of uplink resources based at least in part on the indicator. For example, UE 120 may be configured with different items allocation information, each of which corresponds to a particular set of downlink resources and/or a particular set of uplink resources. In this example, each item of allocation information is associated with a respective indicator. Here, upon receiving a secondary DCI including an indicator, UE 120 may identify the set of downlink resources and/or the set of uplink resources based at least in part on the association between the indicator and the allocation information. In some aspects, the allocation information may be configured (e.g., preconfigured) on the UE via an RRC message and/or via a MAC control element.

Figure 5C:
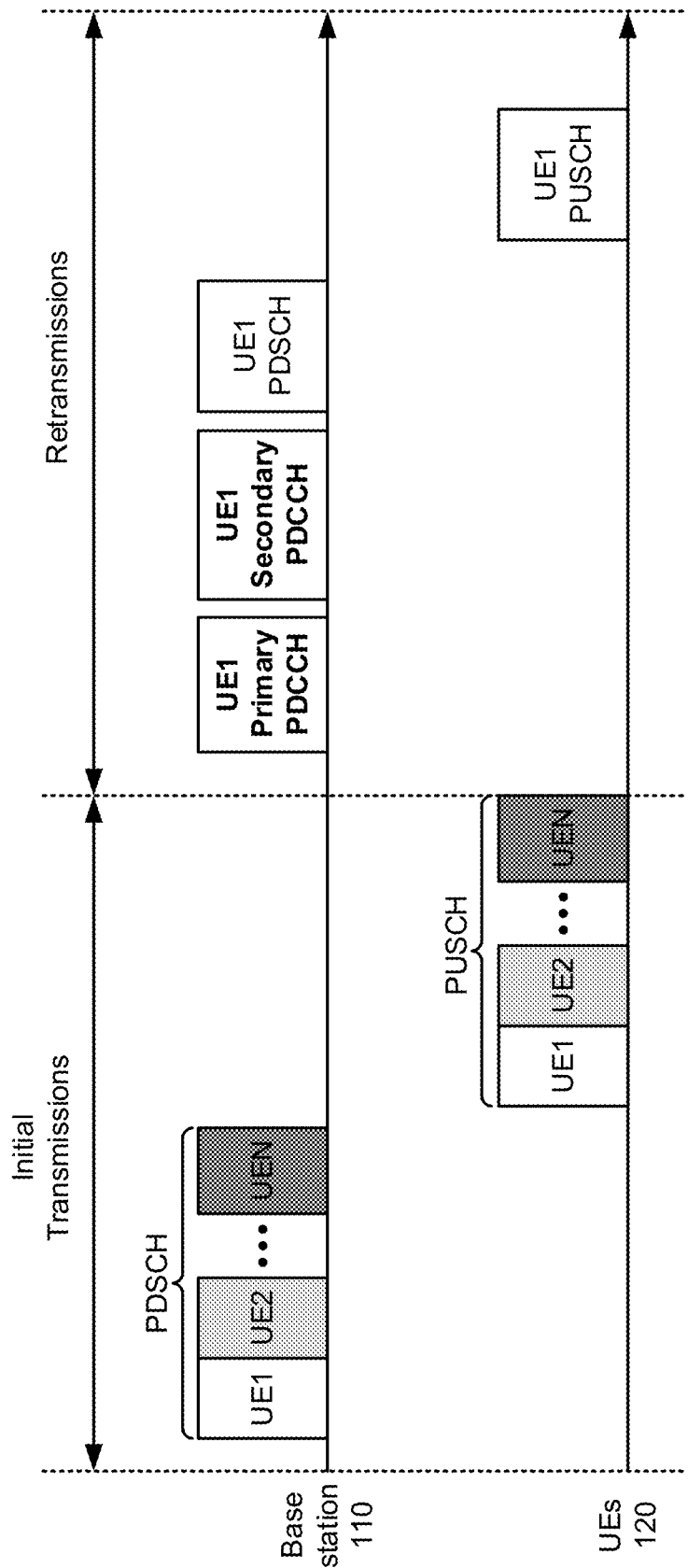

FIG. 5C is a diagram illustrating an example in which the single DCI is a primary DCI, and a secondary DCI is used to determine information that identifies at least one of the set of downlink resources and the set of uplink resources. In FIG. 5C, UE1 is configured to receive an initial downlink communication (e.g., a PDSCH communication) and transmit an initial uplink communication (e.g., a PUSCH communication) based at least in part on, for example, semi-persistent scheduling information configured on UE1 (e.g., such that DCI is not needed for scheduling the initial downlink communication or the initial uplink communication). However, as indicated by FIG. 5C, UE1 may not successfully receive the initial downlink communication and may not successfully transmit the initial uplink communication (e.g., due to path loss to base station 110). Thus, as shown in FIG. 5C, retransmissions are needed. However, these retransmissions need to be scheduled. In the example shown in FIG. 5C, UE1 receives, from base station 110, a primary DCI (e.g., in a PDCCH communication) that includes information associated with a secondary DCI. Here, UE 120 determines the information associated with the secondary DCI based at least in part on the primary DCI, and receives the secondary DCI. In this example, UE 120 determines at least one of information that identifies the set of downlink resources or information that identifies the set of uplink resources based at least in part on the secondary DCI. Thus, as shown in FIG. 5C, UE 120 may receive the retransmission of the downlink communication (e.g., in the set of downlink resources allocated to the UE) and retransmit the uplink communication (e.g., in the set of uplink resources allocated to UE 120) based at least in part on the primary DCI.

In some aspects, the single DCI may carry information that identifies a first set of resources (e.g., either the set of downlink resources or the set of uplink resources), and information that identifies a second set of resources (e.g., the set of resources not identified by the single DCI) may be identified based at least in part on information associated with a communication that uses the first set of resources.

Figure 5D:
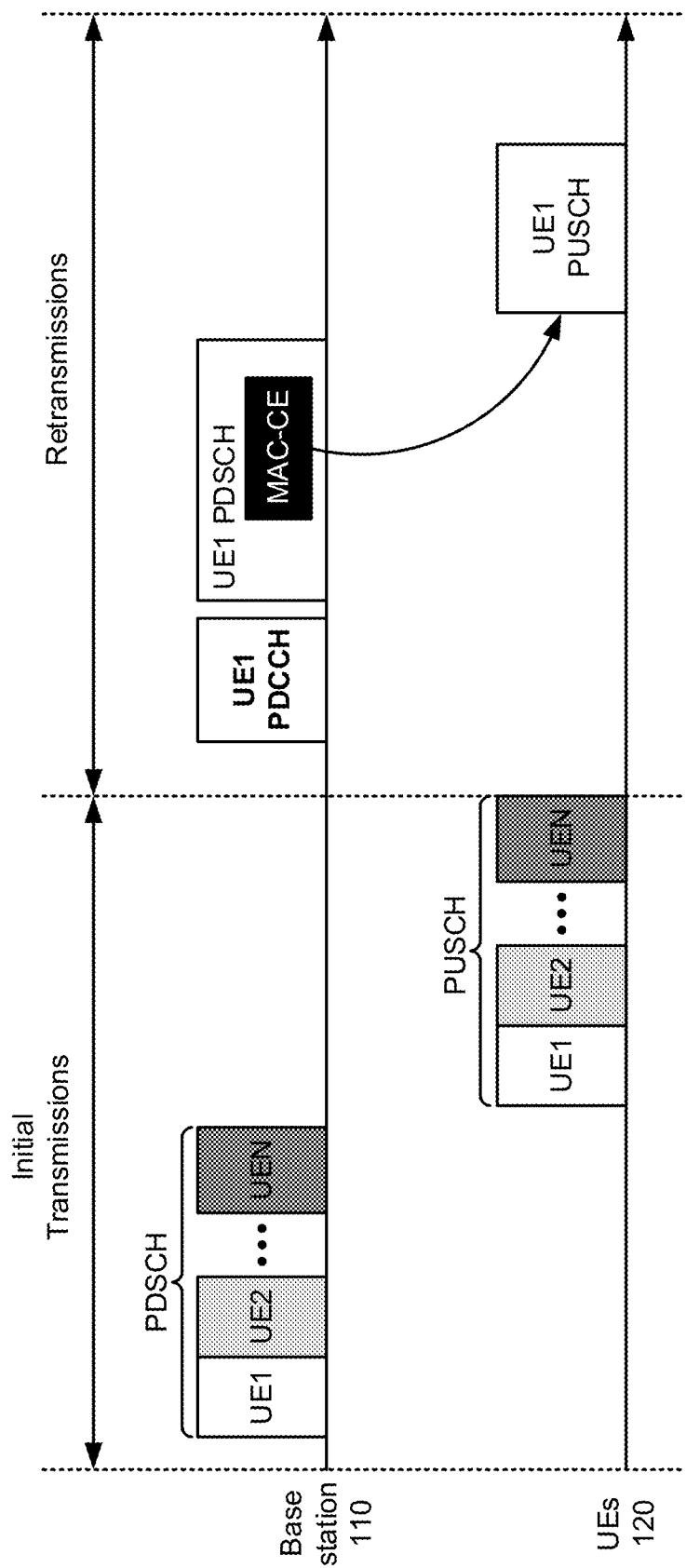

For example, as shown in FIG. 5D, in some aspects, base station 110 may provide a single DCI (e.g., in a PDCCH communication) that includes information associated with identifying the set of downlink resources allocated to UE 120 for the downlink communication. Here, UE 120 may receive the single DCI and determine, based at least in part on the single DCI, information that identifies the set of downlink resources associated with the downlink communication. As shown, UE 120 may receive the downlink communication in the set of downlink resources. Here, the downlink communication, transmitted by base station 110, may include (e.g., in a MAC control element) information that identifies the set of uplink resources. As further shown in FIG. 5D, in some aspects, UE 120 may identify the set of uplink resources based at least in part on the information included in the MAC control element of the downlink communication, and may transmit the uplink communication in the set of uplink resources, accordingly.

As another example, in some aspects, base station 110 may provide a single DCI (e.g., in a PDCCH communication) that includes information associated with identifying the set of uplink resources allocated to UE 120 for the uplink communication. Here, UE 120 may receive the single DCI and determine, based at least in part on the single DCI, information that identifies the set of uplink resources. As shown, UE 120 may transmit the uplink communication in the set of uplink resources. In some aspects, UE 120 may identify the set of downlink resources based at least in part on the uplink communication and a configuration of UE 120. For example, UE 120 may be configured to identify the set of downlink resources, to be used for a subsequent downlink communication, as a set of resources that starts a particular number of slots (e.g., three slots) or a particular number of symbols (e.g., 10 symbols) after the last slot of the uplink communication. Here, UE 120 may transmit information that identifies the set of downlink resources in, for example, a MAC control element of the uplink communication in order to indicate to base station 110 that UE 120 expects to receive the downlink communication in the identified set of downlink resources. Such an aspect may be used when, for example, UE 120 expects to receive, from base station 110, a response to the uplink communication transmitted by UE 120.

In some aspects, one or more scheduling parameters of a semi-persistent scheduling process, associated with UE 120, may be modified based at least in part on information included in a MAC control element in a given communication. In some aspects, the one or more scheduling parameters may include a periodicity associated with the semi-persistent scheduling process, a resource allocation associated with the semi-persistent scheduling process, and/or another scheduling parameter. As an example, base station 110 may transmit a single DCI including information associated with identifying a set of downlink resources for the downlink communication. Here, UE 120 may receive the downlink communication based at least in part on the single DCI, and the downlink communication may include a MAC control element that indicates that UE 120 is to modify a periodicity and/or a resource allocation associated with a semi-persistent scheduling process configured on UE 120.

As another example, base station 110 may transmit a single DCI including information associated with identifying a set of uplink resources for the uplink communication. Here, UE 120 may transmit the uplink communication based at least in part on the single DCI, and the uplink communication may include a MAC control element that indicates a request by UE 120 to modify a periodicity and/or a resource allocation associated with a semi-persistent scheduling process configured on UE 120. Here, base station 110 may receive the MAC control element in the uplink communication, and may act accordingly (e.g., sending an approval indicating that the semi-persistent scheduling process has been modified as requested, sending a denial indicating that the semi-persistent scheduling process may not be modified as requested, and/or the like).

As indicated above, FIGS. 5A-5D are provided as examples. Other examples may differ from what is described with respect to FIGS. 5A-5D.

Figure 6:
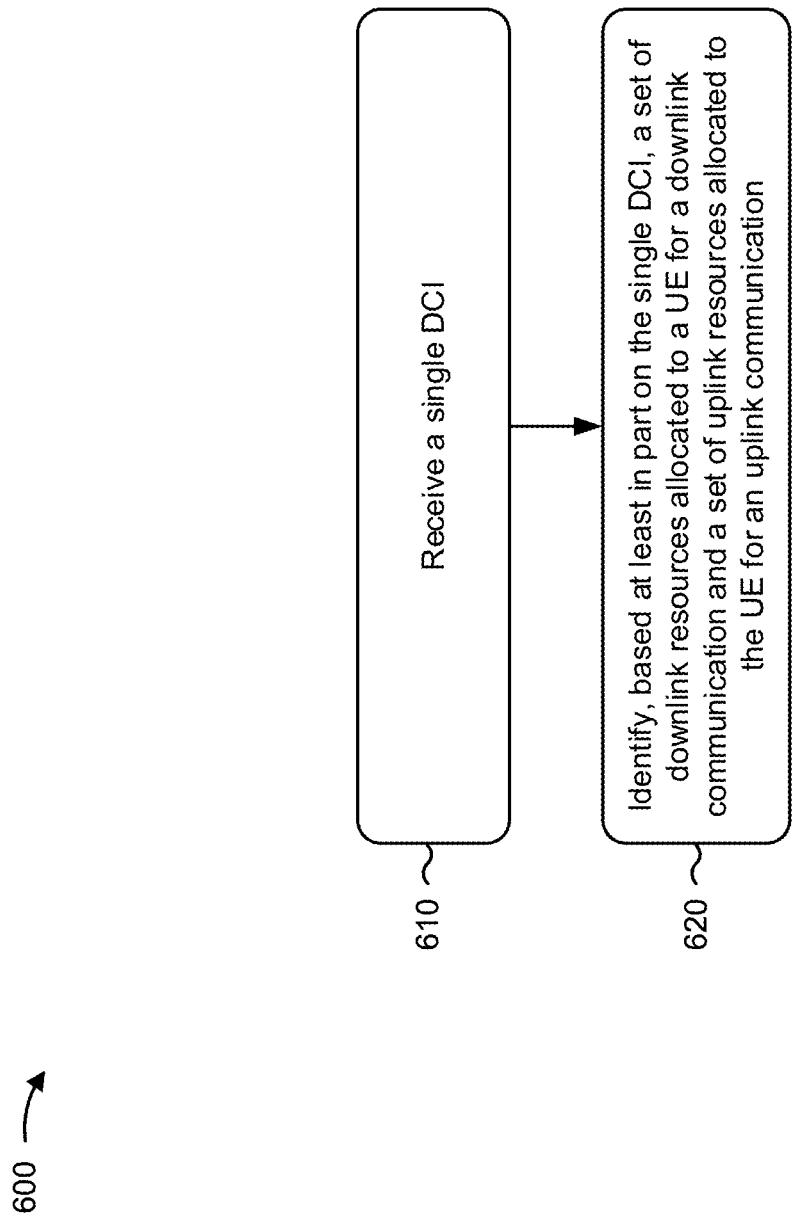
FIG. 6 is a diagram illustrating an example process performed, for example, by a user equipment, in accordance with various aspects of the present disclosure.

FIG. 6 is a diagram illustrating an example process 600 performed, for example, by a UE, in accordance with various aspects of the present disclosure. Example process 600 is an example where a UE (e.g., UE 120) performs operations associated with single DCI for joint downlink and uplink allocation.

As shown in FIG. 6, in some aspects, process 600 may include receiving a single DCI (block 610). For example, the UE (e.g., using antenna 252, DEMOD 254, MIMO detector 258, receive processor 258, controller/processor 280, and/or the like) may receive a single DCI, as described above.

As further shown in FIG. 6, in some aspects, process 600 may include identifying, based at least in part on the single DCI, a set of downlink resources allocated to the UE for a downlink communication and a set of uplink resources allocated to the UE for an uplink communication (block 620). For example, the UE (e.g., using receive processor 258, controller/processor 280, memory 282, and/or the like) may identify, based at least in part on the single DCI, a set of downlink resources allocated to the UE for a downlink communication and a set of uplink resources allocated to the UE for an uplink communication, as described above.

Process 600 may include additional aspects, such as any single implementation or any combination of aspects described below and/or in connection with one or more other processes described elsewhere herein.

In a first aspect, the single DCI includes information that identifies the set of downlink resources and information that identifies the set of uplink resources.

In a second aspect, alone or in combination with the first aspect, the single DCI includes resource allocation information that includes the information that identifies the set of downlink resources and the information that identifies the set of uplink resources.

In a third aspect, alone or in combination with any one or more of the first and second aspects, the information that identifies the set of downlink resources or the information that identifies the set of uplink resources is determined based at least in part on an indicator included in the single DCI.

In a fourth aspect, alone or in combination with any one or more of the first through third aspects, the indicator is a reserved bit included in the single DCI.

In a fifth aspect, alone or in combination with any one or more of the first through fourth aspects, the indicator is a field entry included in the single DCI.

In a sixth aspect, alone or in combination with any one or more of the first through fifth aspects, the indicator corresponds to allocation information configured on the UE.

In a seventh aspect, alone or in combination with any one or more of the first through sixth aspects, the allocation information is configured on the UE via a radio resource control (RRC) message.

In an eighth aspect, alone or in combination with any one or more of the first through seventh aspects, the allocation information is configured on the UE via a medium access control (MAC) control element.

In a ninth aspect, alone or in combination with any one or more of the first through eighth aspects, the single DCI is a primary DCI that includes information associated with a secondary DCI, and the UE may receive the secondary DCI based at least in part on the information associated with the secondary DCI.

In a tenth aspect, alone or in combination with any one or more of the first through ninth aspects, at least one of the set of downlink resources and the set of uplink resources is identified based at least in part on the secondary DCI.

In an eleventh aspect, alone or in combination with any one or more of the first through tenth aspects, either the set of downlink resources is identified based at least in part on the primary DCI or the set of uplink resources is identified based at least in part on the primary DCI.

In a twelfth aspect, alone or in combination with any one or more of the first through eleventh aspects, the information associated with the secondary DCI includes information indicating an existence of the secondary DCI and information indicating a format of the secondary DCI.

In a thirteenth aspect, alone or in combination with any one or more of the first through twelfth aspects, the information associated with the secondary DCI includes resource allocation information that identifies a set of resources associated with the secondary DCI.

In a fourteenth aspect, alone or in combination with any one or more of the first through thirteenth aspects, the information associated with the secondary DCI is determined based at least in part on an indicator included in the primary DCI.

In a fifteenth aspect, alone or in combination with any one or more of the first through fourteenth aspects, the indicator is a reserved bit included in the primary DCI.

In a sixteenth aspect, alone or in combination with any one or more of the first through fifteenth aspects, the indicator is a field entry included in the primary DCI.

In a seventeenth aspect, alone or in combination with any one or more of the first through sixteenth aspects, the secondary DCI includes resource allocation information that identifies the set of downlink resources or the set of uplink resources.

In an eighteenth aspect, alone or in combination with any one or more of the first through seventeenth aspects, information that identifies the set of downlink resources or information that identifies the set of uplink resources is determined based at least in part on an indicator included in the secondary DCI.

In a nineteenth aspect, alone or in combination with any one or more of the first through eighteenth aspects, the indicator is a reserved bit included in the secondary DCI.

In a twentieth aspect, alone or in combination with any one or more of the first through nineteenth aspects, the indicator is a field entry included in the secondary DCI.

In a twenty-first aspect, alone or in combination with any one or more of the first through twentieth aspects, the indicator corresponds to allocation information configured on the UE.

In a twenty-second aspect, alone or in combination with any one or more of the first through twenty-first aspects, the allocation information is configured on the UE via a radio resource control (RRC) message.

In a twenty-third aspect, alone or in combination with any one or more of the first through twenty-second aspects, the allocation information is configured on the UE via a medium access control (MAC) control element.

In a twenty-fourth aspect, alone or in combination with any one or more of the first through twenty-third aspects, the UE may receive the downlink communication in the set of downlink resources allocated to the UE. Here, the set of uplink resources is identified based at least in part on a medium access control (MAC) control element associated with the downlink communication.

In a twenty-fifth aspect, alone or in combination with any one or more of the first through twenty-fourth aspects, the UE may transmit the uplink communication in the set of uplink resources allocated to the UE. Here, the set of downlink resources is identified based at least in part on a medium access control (MAC) control element associated with the uplink communication.

In a twenty-sixth aspect, alone or in combination with any one or more of the first through twenty-fifth aspects, one or more scheduling parameters of a semi-persistent scheduling process, associated with the UE, are modified based at least in part on information included in a medium access control (MAC) control element received by the UE or transmitted by the UE.

In a twenty-seventh aspect, alone or in combination with any one or more of the first through twenty-sixth aspects, the one or more scheduling parameters include a periodicity associated with the semi-persistent scheduling process or a resource allocation associated with the semi-persistent scheduling process.

In a twenty-eighth aspect, alone or in combination with any one or more of the first through twenty-seventh aspects, the downlink communication is received by the UE in the set of downlink resources allocated to the UE for the downlink communication.

In a twenty-ninth aspect, alone or in combination with any one or more of the first through twenty-eighth aspects, the uplink communication is transmitted by the UE in the set of uplink resources allocated to the UE for the uplink communication.

In a thirtieth aspect, alone or in combination with any one or more of the first through twenty-ninth aspects, the single DCI is received in a physical downlink control channel (PDCCH).

In a thirty-first aspect, alone or in combination with any one or more of the first through thirtieth aspects, the downlink communication is a physical downlink shared channel (PDSCH) communication.

In a thirty-second aspect, alone or in combination with any one or more of the first through thirty-first aspects, the uplink communication is a physical uplink shared channel (PUSCH) communication.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
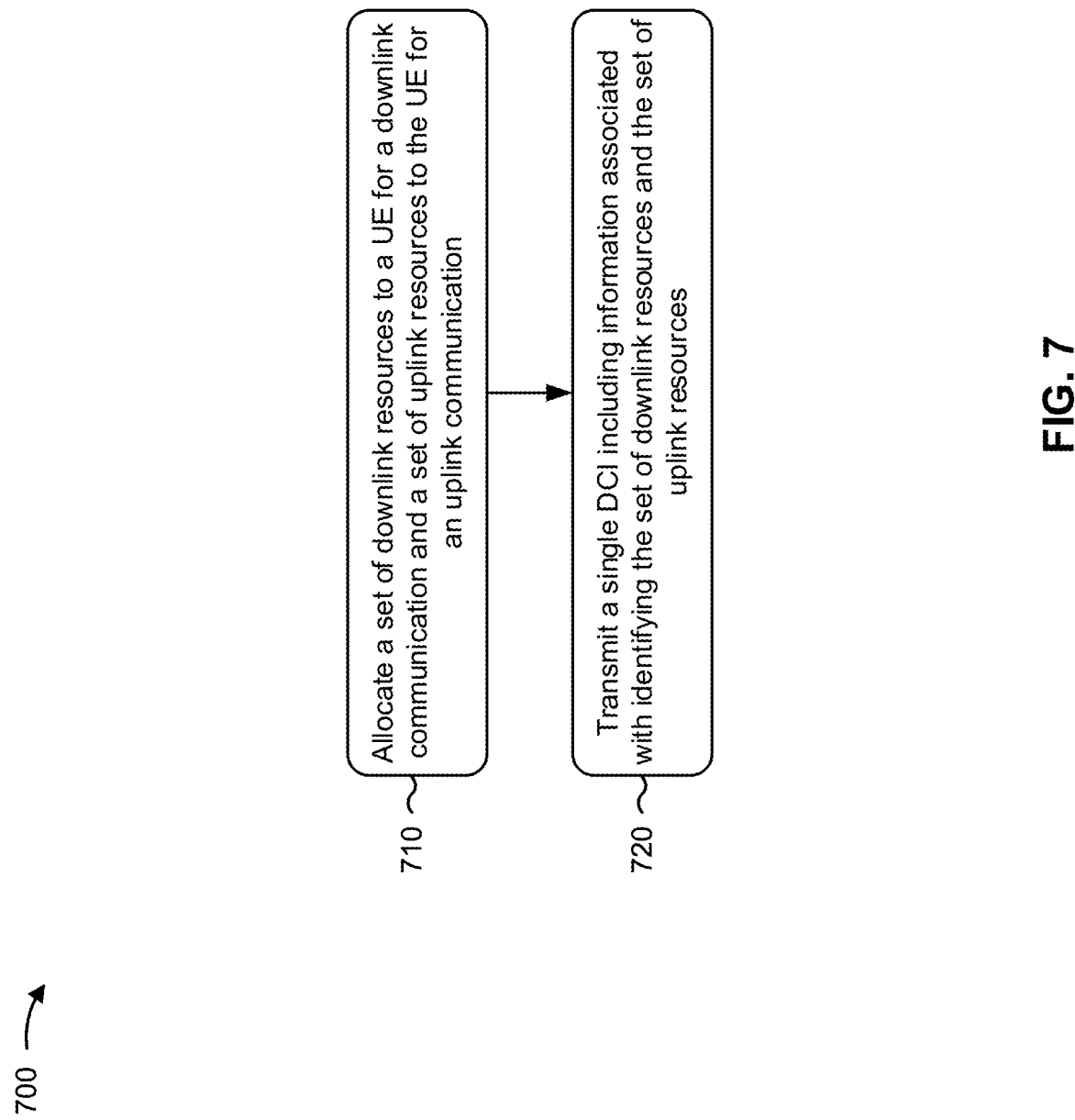
FIG. 7 is a diagram illustrating an example process performed, for example, by a user equipment, in accordance with various aspects of the present disclosure.

FIG. 7 is a diagram illustrating an example process 700 performed, for example, by a base station, in accordance with various aspects of the present disclosure. Example process 700 is an example where a base station (e.g., base station 110) performs operations associated with single DCI for joint downlink and uplink allocation.

As shown in FIG. 7, in some aspects, process 700 may include allocating a set of downlink resources to a UE for a downlink communication and a set of uplink resources to the UE for an uplink communication (block 710). For example, the base station (e.g., using transmit processor 220, receive processor 238, controller/processor 240, schedule 246, and/or the like) may allocate a set of downlink resources to a UE (e.g., UE 120) for a downlink communication and a set of uplink resources to the UE for an uplink communication, as described above.

As further shown in FIG. 7, in some aspects, process 700 may include transmitting a single DCI including information associated with identifying the set of downlink resources and the set of uplink resources (block 720). For example, the base station (e.g., using antenna 234, modulator 232, TX MIMO processor 230, transmit processor 220, controller/processor 240, memory 242, and/or the like) may transmit a single DCI including information associated with identifying the set of downlink resources and the set of uplink resources, as described above.

Process 700 may include additional aspects, such as any single implementation or any combination of aspects described below and/or in connection with one or more other processes described elsewhere herein.

In a first aspect, the single DCI includes information that identifies the set of downlink resources and information that identifies the set of uplink resources.

In a second aspect, alone or in combination with the first aspect, the single DCI includes resource allocation information that includes the information that identifies the set of downlink resources and the information that identifies the set of uplink resources.

In a third aspect, alone or in combination with any one or more of the first and second aspects, the information that identifies the set of downlink resources or the information that identifies the set of uplink resources is to be determined based at least in part on an indicator included in the single DCI.

In a fourth aspect, alone or in combination with any one or more of the first through third aspects, the indicator is a reserved bit included in the single DCI.

In a fifth aspect, alone or in combination with any one or more of the first through fourth aspects, the indicator is a field entry included in the single DCI.

In a sixth aspect, alone or in combination with any one or more of the first through fifth aspects, the indicator corresponds to allocation information configured on the UE.

In a seventh aspect, alone or in combination with any one or more of the first through sixth aspects, the allocation information is configured on the UE via a radio resource control (RRC) message.

In an eighth aspect, alone or in combination with any one or more of the first through seventh aspects, the allocation information is configured on the UE via a medium access control (MAC) control element.

In a ninth aspect, alone or in combination with any one or more of the first through eighth aspects, the single DCI is a primary DCI that includes information associated with a secondary DCI, and the base station may transmit the secondary DCI. Here, at least one of the set of downlink resources and the set of uplink resources is to be identified based at least in part on the secondary DCI.

In a tenth aspect, alone or in combination with any one or more of the first through ninth aspects, either the set of downlink resources is to be identified based at least in part on the primary DCI or the set of uplink resources is to be identified based at least in part on the primary DCI.

In an eleventh aspect, alone or in combination with any one or more of the first through tenth aspects, the information associated with the secondary DCI includes information indicating an existence of the secondary DCI and information indicating a format of the secondary DCI.

In a twelfth aspect, alone or in combination with any one or more of the first through eleventh aspects, the information associated with the secondary DCI includes resource allocation information that identifies a set of resources associated with the secondary DCI.

In a thirteenth aspect, alone or in combination with any one or more of the first through twelfth aspects, the information associated with the secondary DCI is to be determined based at least in part on an indicator included in the primary DCI.

In a fourteenth aspect, alone or in combination with any one or more of the first through thirteenth aspects, the indicator is a reserved bit included in the primary DCI.

In a fifteenth aspect, alone or in combination with any one or more of the first through fourteenth aspects, the indicator is a field entry included in the primary DCI.

In a sixteenth aspect, alone or in combination with any one or more of the first through fifteenth aspects, the secondary DCI includes resource allocation information that identifies the set of downlink resources or the set of uplink resources.

In a seventeenth aspect, alone or in combination with any one or more of the first through sixteenth aspects, information that identifies the set of downlink resources or information that identifies the set of uplink resources is to be determined based at least in part on an indicator included in the secondary DCI.

In an eighteenth aspect, alone or in combination with any one or more of the first through seventeenth aspects, the indicator is a reserved bit included in the secondary DCI.

In a nineteenth aspect, alone or in combination with any one or more of the first through eighteenth aspects, the indicator is a field entry included in the secondary DCI.

In a twentieth aspect, alone or in combination with any one or more of the first through nineteenth aspects, the indicator corresponds to allocation information configured on the UE.

In a twenty-first aspect, alone or in combination with any one or more of the first through twentieth aspects, the allocation information is configured on the UE via a radio resource control (RRC) message.

In a twenty-second aspect, alone or in combination with any one or more of the first through twenty-first aspects, the allocation information is configured on the UE via a medium access control (MAC) control element.

In a twenty-third aspect, alone or in combination with any one or more of the first through twenty-second aspects, the base station may transmit the downlink communication in the set of downlink resources allocated to the UE. Here, the set of uplink resources is to be identified based at least in part on a medium access control (MAC) control element associated with the downlink communication.

In a twenty-fourth aspect, alone or in combination with any one or more of the first through twenty-third aspects, the base station may receive the uplink communication in the set of uplink resources allocated to the UE. Here, the set of downlink resources is to be identified based at least in part on a medium access control (MAC) control element associated with the uplink communication.

In a twenty-fifth aspect, alone or in combination with any one or more of the first through twenty-fourth aspects, one or more scheduling parameters of a semi-persistent scheduling process, associated with the UE, are modified based at least in part on information included in a medium access control (MAC) control element received by the base station or transmitted by the base station.

In a twenty-sixth aspect, alone or in combination with any one or more of the first through twenty-fifth aspects, the one or more scheduling parameters include a periodicity associated with the semi-persistent scheduling process or a resource allocation associated with the semi-persistent scheduling process.

In a twenty-seventh aspect, alone or in combination with any one or more of the first through twenty-sixth aspects, the downlink communication is transmitted by the base station in the set of downlink resources allocated to the UE for the downlink communication.

In a twenty-eighth aspect, alone or in combination with any one or more of the first through twenty-seventh aspects, the uplink communication is received by the base station in the set of uplink resources allocated to the UE for the uplink communication.

In a twenty-ninth aspect, alone or in combination with any one or more of the first through twenty-eighth aspects, the single DCI is transmitted in a physical downlink control channel (PDCCH).

In a thirtieth aspect, alone or in combination with any one or more of the first through twenty-ninth aspects, the downlink communication is a physical downlink shared channel (PDSCH) communication.

In a thirty-first aspect, alone or in combination with any one or more of the first through thirtieth aspects, the uplink communication is a physical uplink shared channel (PUSCH) communication.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a single downlink control information (DCI); and
   identifying, based at least in part on a reserved bit, of a plurality of bits included the single DCI, or a reserved field entry of a plurality of field entries included in the single DCI, at least one of a set of downlink resources allocated to the UE for a downlink communication or a set of uplink resources allocated to the UE for an uplink communication.

2. The method of claim 1, wherein the single DCI includes information that identifies the set of downlink resources and information that identifies the set of uplink resources.

3. The method of claim 2, wherein the single DCI includes resource allocation information that includes the information that identifies the set of downlink resources and the information that identifies the set of uplink resources.

4. The method of claim 2, wherein the information that identifies the set of downlink resources or the information that identifies the set of uplink resources is determined based at least in part on the reserved bit or the reserved field entry.

5. The method of claim 2, wherein the single DCI includes the plurality of reserved bits.

6. The method of claim 2, wherein the single DCI includes the plurality of field entries.

7. The method of claim 2, wherein the reserved bit or the reserved field entry corresponds to allocation information configured on the UE.

8. The method of claim 7, wherein the allocation information is configured on the UE via at least one of a radio resource control (RRC) message or a medium access control (MAC) control element.

9. The method of claim 1, wherein the single DCI is a primary DCI that includes information associated with a secondary DCI, and
   wherein method further comprises:
      receiving the secondary DCI based at least in part on the information associated with the secondary DCI, wherein at least one of the set of downlink resources and the set of uplink resources is identified based at least in part on the secondary DCI.

10. The method of claim 9, wherein either the set of downlink resources is identified based at least in part on the primary DCI or the set of uplink resources is identified based at least in part on the primary DCI.

11. The method of claim 9, wherein the information associated with the secondary DCI includes information indicating an existence of the secondary DCI and information indicating a format of the secondary DCI.

12. The method of claim 9, wherein the information associated with the secondary DCI includes resource allocation information that identifies a set of resources associated with the secondary DCI.

13. The method of claim 9, wherein the information associated with the secondary DCI is determined based at least in part on an indicator included in the primary DCI.

14. The method of claim 13, wherein the indicator is a reserved bit included in the primary DCI.

15. The method of claim 13, wherein the indicator is a field entry included in the primary DCI.

16. The method of claim 9, wherein the secondary DCI includes resource allocation information that identifies the set of downlink resources or the set of uplink resources.

17. The method of claim 9, wherein information that identifies the set of downlink resources or information that identifies the set of uplink resources is determined based at least in part on an indicator included in the secondary DCI.

18. The method of claim 17, wherein the indicator is a reserved bit included in the secondary DCI.

19. The method of claim 17, wherein the indicator is a field entry included in the secondary DCI.

20. The method of claim 17, wherein the indicator corresponds to allocation information configured on the UE.

21. The method of claim 20, wherein the allocation information is configured on the UE via at least one of a radio resource control (RRC) message or a medium access control (MAC) control element.

22. The method of claim 1, further comprising:
   receiving the downlink communication in the set of downlink resources allocated to the UE,
      wherein the set of uplink resources is identified based at least in part on a medium access control (MAC) control element associated with the downlink communication.

23. The method of claim 1, further comprising
   transmitting the uplink communication in the set of uplink resources allocated to the UE,
      wherein the set of downlink resources is identified based at least in part on a medium access control (MAC) control element associated with the uplink communication.

24. The method of claim 1, wherein one or more scheduling parameters of a semi-persistent scheduling process, associated with the UE, are modified based at least in part on information included in a medium access control (MAC) control element received by the UE or transmitted by the UE.

25. The method of claim 24, wherein the one or more scheduling parameters include a periodicity associated with the semi-persistent scheduling process or a resource allocation associated with the semi-persistent scheduling process.

26. The method of claim 1, wherein the downlink communication is received by the UE in the set of downlink resources allocated to the UE for the downlink communication.

27. The method of claim 1, wherein the uplink communication is transmitted by the UE in the set of uplink resources allocated to the UE for the uplink communication.

28. A method of wireless communication performed by a base station, comprising:
   allocating a set of downlink resources to a user equipment (UE) for a downlink communication and a set of uplink resources to the UE for an uplink communication; and
   transmitting a single downlink control information (DCI) including a reserved bit, of a plurality of bits, or a reserved field entry, of a plurality of field entries, associated with identifying at least one of the set of downlink resources or the set of uplink resources.

29. A user equipment (UE) for wireless communication, comprising:
   a memory; and
   one or more processors operatively coupled to the memory, the memory and the one or more processors configured to:
      receive a single downlink control information (DCI); and
      identify, based at least in part on a reserved bit, of a plurality of bits included the single DCI, or a reserved field of a plurality of field entries included in the single DCI, at least one of a set of downlink resources allocated to the UE for a downlink communication or a set of uplink resources allocated to the UE for an uplink communication.

30. A base station for wireless communication, comprising:
   a memory; and
   one or more processors operatively coupled to the memory, the memory and the one or more processors configured to:
      allocate a set of downlink resources to a user equipment (UE) for a downlink communication and a set of uplink resources to the UE for an uplink communication; and
      transmit a single downlink control information (DCI) including a reserved bit, of a plurality of bits, or a reserved field entry, of a plurality of field entries, associated with identifying at least one of the set of downlink resources or the set of uplink resources.

* * * * *